(12) United States Patent
Tsai

(10) Patent No.: US 6,236,472 B1
(45) Date of Patent: *May 22, 2001

(54) FLATBED SCANNERS WITH SINGLE DYNAMIC SOURCE

(75) Inventor: Jenn-Tsair Tsai, Taipei (TW)

(73) Assignee: Mustek Systems Inc., Hsinchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,032

(22) Filed: Apr. 1, 1998

(51) Int. Cl.$^7$ ....................................................... H04N 1/04
(52) U.S. Cl. ............................................................ 358/487
(58) Field of Search .................................. 358/474, 475, 358/487, 506, 494, 497; 356/432, 444, 443; 359/627

(56) References Cited

U.S. PATENT DOCUMENTS

| | | | |
|---|---|---|---|
| 4,870,294 | * 9/1989 | Hasegawa | 358/494 |
| 4,873,579 | * 10/1989 | Kubota et al. | 358/474 |
| 4,996,604 | * 2/1991 | Ogawa et al. | 358/474 |
| 5,298,931 | * 3/1994 | Telle | 355/23 |
| 5,381,245 | * 1/1995 | Johnston et al. | 358/487 |
| 5,677,777 | * 10/1997 | Tsai | 358/475 |
| 5,822,087 | * 10/1998 | Tsai | 358/475 |
| 5,895,914 | * 4/1999 | Tsai | 358/474 |

* cited by examiner

Primary Examiner—Jerome Grant, II

(57) ABSTRACT

The present invention discloses a flatbed scanner that utilizes a single dynamic source to support dynamic for both the light source projection device and the image generation device. The dynamic generated by the single dynamic source is respectively dispatched to the light source projection device and the image generation device through two separate transmission paths for scanning.

15 Claims, 4 Drawing Sheets

FLATBED SCANNERS WITH SINGLE DYNAMIC SOURCE

BACKGROUND OF THE INVENTION

1. Field of the Invention

This invention relates to a flatbed scanner, and more particularly, to a flatbed scanner that uses a single dynamic source to support dynamic for both the light projection device and the image pick-up device of the flatbed scanner.

2. Description of the Prior Art

Nowadays, kinds of scanners are broadly used in computers. Some scanners can scan reflective documents by feeding the reflective documents into the scanners themselves, however, transparent documents only can be scanned through the assistant devices of the scanners. A convenient way for scanning both of the transparent and reflective documents is to apply flatbed scanners. Accordingly, after the transparent documents are put at the top of the transparent windows of the flatbed scanners, the transparent documents can thus be scanned through the cooperation of both the light source and the image generation devices.

FIG. 2 depicts the cross section of a conventional flatbed scanner 20 that is composed of an upper portion 201 and a lower portion 202 for cooperatively scanning a scanned document 218. The upper portion 201 and a lower portion 202 are fastened by using a connection apparatus 219, and the scanned document 218 can be a transparent document such as a projection slide or a lantern slide. When scan operations start, the dynamic generated by the motor 208 of the upper portion 201 will be transferred through gear sets 207, a pulley 203, and a transmission belt 204 to drive the light projection device 205. In addition, a dynamic generated by the motor 216 of the lower portion 202 is transferred through gear sets 215, a pulley 209, and transmission belt 210 to drive the image pick-up device 211. The light projection device 205 further includes a light source 206. Furthermore, the image pick-up device 211 encompasses a scanning set, which further comprises a light source 212, mirrors 217, lenses 213, and a CCD (Charge-Coupled Device) sensor 214. As noted, both the light projection device 205 and the image pick-up device 211 move together to scan the scanned document 218 cooperatively. Moreover, the light source 206 is used for scanning the transparent documents, and the light source 212 is used to scan the reflective documents.

Evidently, in the flatbed scanner, both of the upper and lower portions respectively need a motor to generated required dynamic. It is obvious that more power consumption and further components are necessary to establish the flatbed scanner 20, and more controlled lines are also required for controlling the cooperation between the light projection device 205 and the image pick-up device 211. A need has been arisen to disclose a flatbed scanner, in which less power consumption and fewer required components are needed for controlling the scan operations.

SUMMARY OF THE INVENTION

The object of the invention is to disclose a flatbed scanner that scans the scanned documents by using less power consumption and fewer required components than the conventional scheme.

Accordingly, the invention employs a single dynamic source to generate dynamic for both the light projection device and the image pick-up device of the flatbed scanner. When the dynamic is generated, it is then transferred by gear sets and transferred components to respectively drive the light projection device and the image pick-up device to perform the scan operations.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 3:
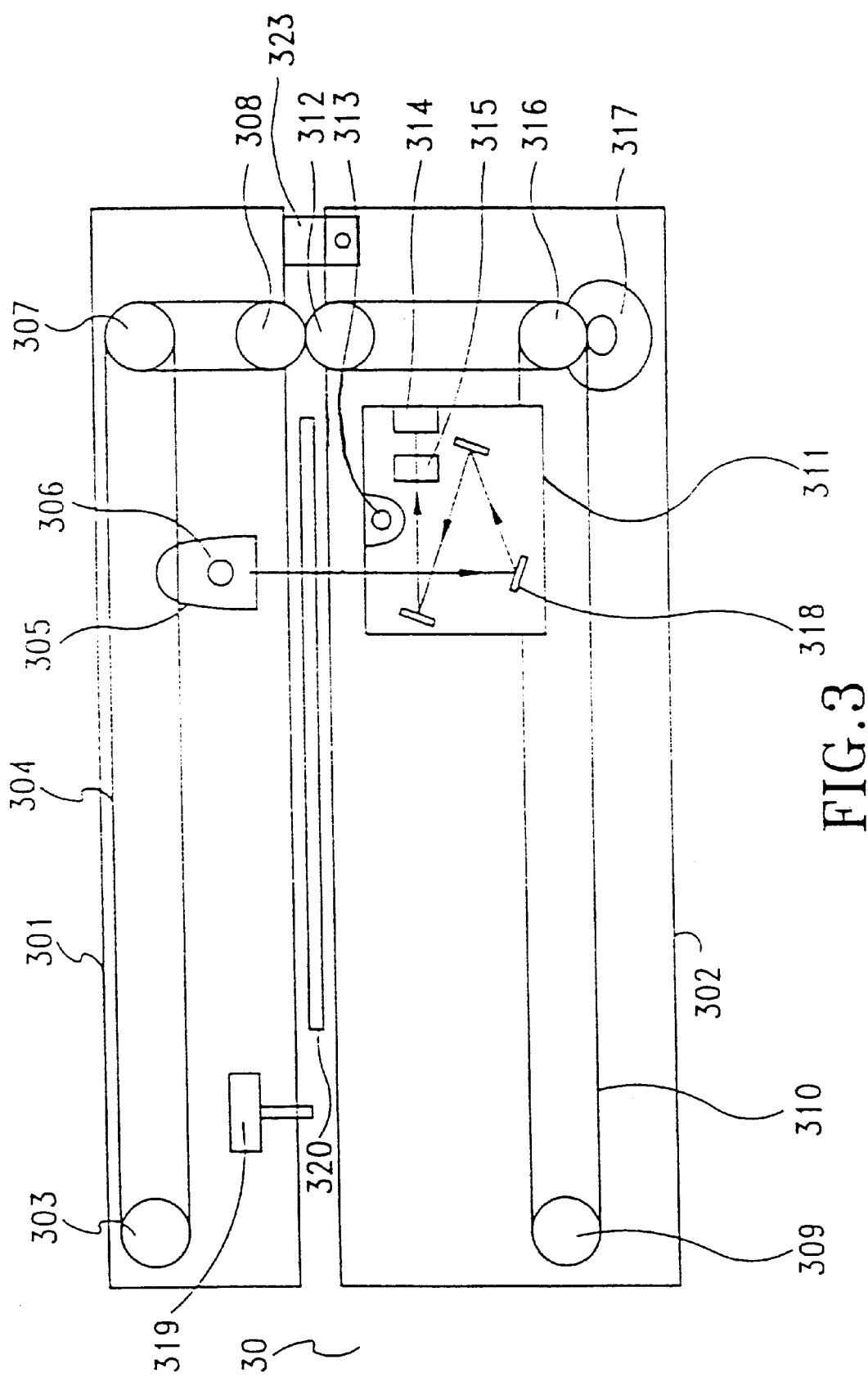
FIG. 3 is a cross-sectional view of the invention when a scanned document is scanned.

Please refer to FIG. 3, which represents the cross section view of the flatbed scanner 30 according to the invention when a scanned document 320 is scanned. Similar to the conventional flatbed scanner, the flatbed scanner 30 includes an upper portion 301 and a lower portion 302, and a connection apparatus 323 is also used to fasten the upper portion 301 and the lower portion 302. However, dynamic generated by a motor 317 will be transferred to both the upper portion 301 and a lower portion 302.

A transference flow of the dynamic source force for the upper portion 301 starts from the motor 317, through gear sets 316, 312, and 308 to drive the gear sets 307, pulley 303, and transmission belt 304 to move a light projection device 305. The light projection device 305 further encompasses a light source 306 for illuminating lights when the scanned document 320 is a transparent document. Besides, the transference flow of the dynamic source force for the lower portion 302 starts from the motor 317, through gear sets 316, pulley 309, and transmission belt 310 to move an image pick-up device 311. The image pick-up device 311 further encompasses a light source 313, mirrors 318, lenses 315, and a CCD sensor 314 for generating scanned image of the scanned document 320. As noted, the light source 313 illuminates lights for scanning when the scanned document 320 is a reflective document. Moreover, a sensor 319 is used to detect whether the upper portion 301 and the lower portion 302 are accurately fastened.

Obviously, only a single motor 317 is needed to support required dynamic source force for the flatbed scanner 30 without additional components to control the cooperation of the upper portion 301 and the lower portion 302. Furthermore, another imaging structure such as a CIS (Contact Image Sensor) and a CMOS (Complementary Metal-Oxide-Semiconductor) sensor can be applied in the image pick-up device 311 although a CCD imaging structure is used in the image pick-up device 311.

Figure 1:
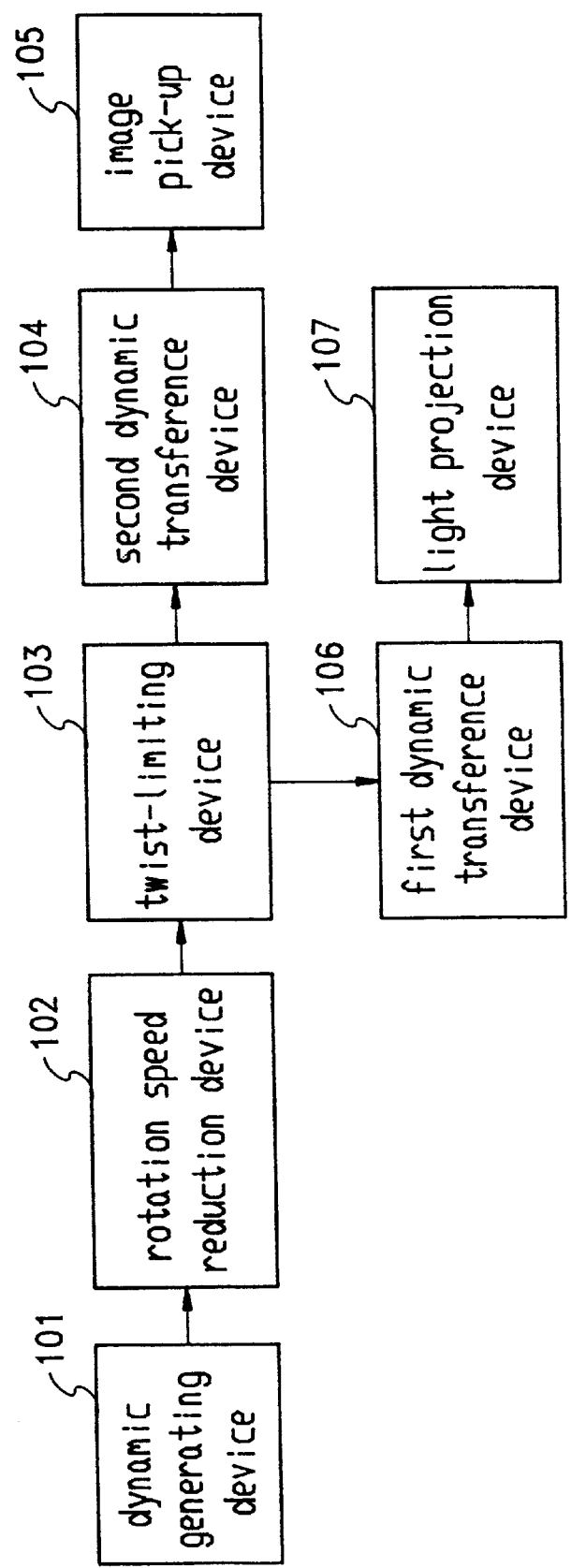
FIG. 1 depicts a flow chart representative of the path of the dynamic transference according to the invention.
Figure 2:
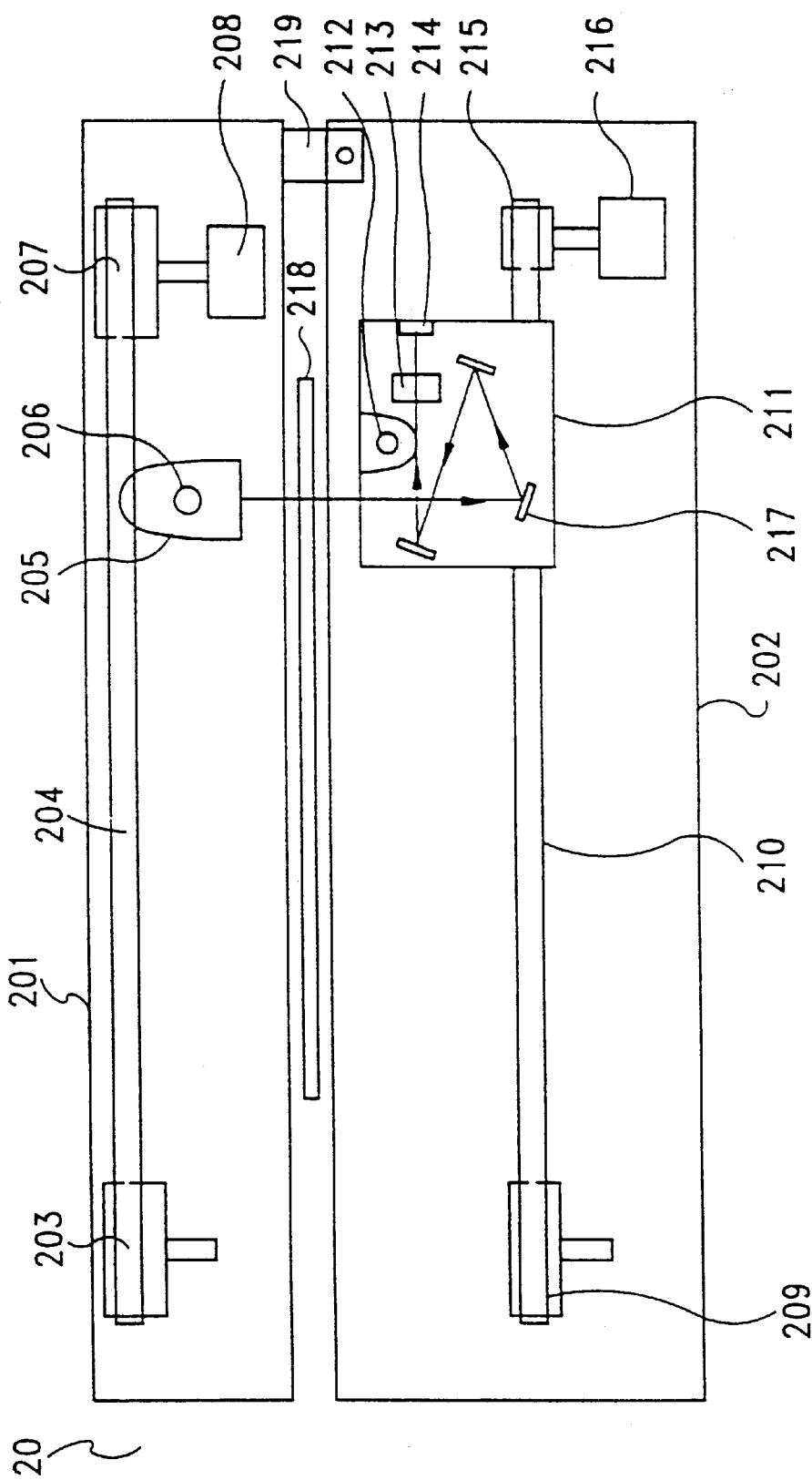
FIG. 2 illustrates a cross section of the conventional flatbed scanner when a scanned document is scanned.

Some processes are needed before the dynamic outputs for scanning. FIG. 1 illustrates a dynamic transference flow representative of how the dynamic being transferred to the upper portion 301 and the lower portion 302. When a dynamic generating device 101 is used to generate the dynamic, a rotation speed reducing device 102 must be applied to decrease the rotation speed of the dynamic generating device 101. Next, a twist-limited device 103 is employed to transfer the dynamic for driving a first dynamic transference device 106 and a second dynamic transference device 104 to back to their origin positions before scanning. Finally, the dynamic from the first dynamic transference device 106 and the second dynamic transference device 104 is respectively employed to drive an image pick-up device 105 and a light projection device 107 to scan the scanned document.

In comparison with the FIG. 3, the dynamic generating device 101 is the motor 317, the first dynamic transference device 106 basically encompasses the gear sets 316, 312, 308, 307, pulley 303, and the transmission belt 304. Further, the second dynamic transference device 104 includes the gear sets 316, pulley 309, and the transmission belt 310. In addition, the image pick-up device 105 is equivalent to the image pick-up device 311, and the light projection device 107 is the light projection device 305.

Figure 4:
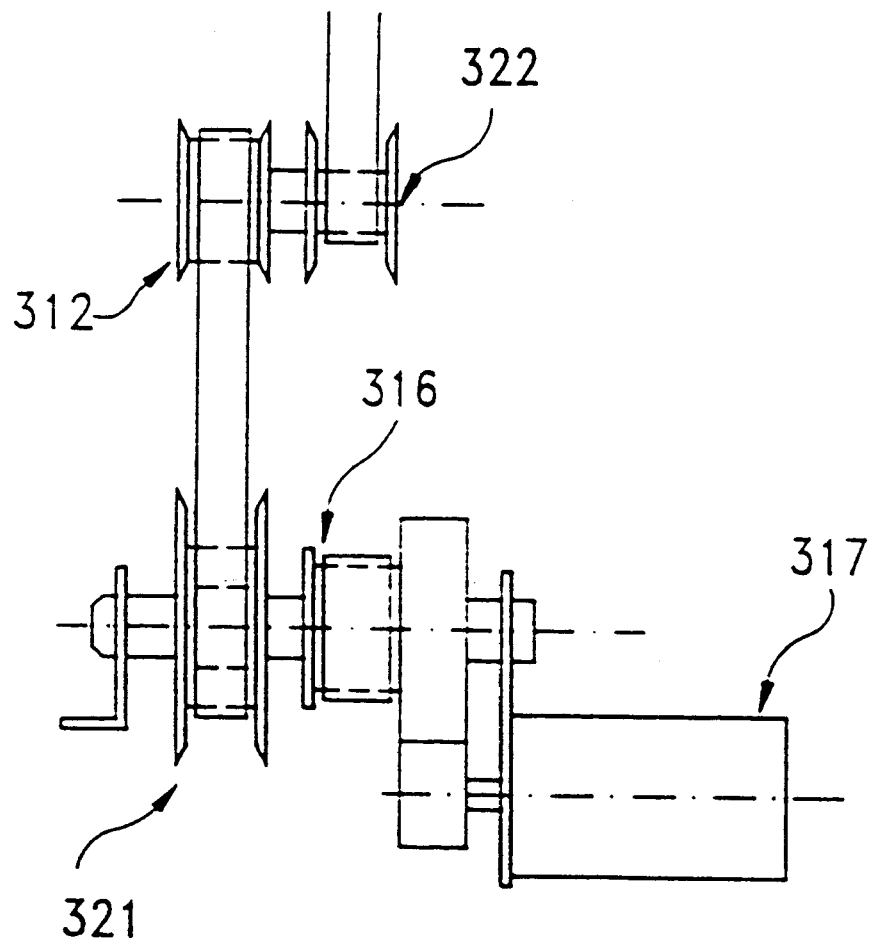
FIG. 4 demonstrates a cross section representative of twist-limited device used in the invention.

Please refer to FIG. 4, which illustrates a cross section representative of the detail diagram of the twist-limited device 103. In fact, the twist-limited device 103 encompasses a magnetic driving device 321, and the dynamic is exported through the gear sets 316. The gear sets 312 and 322 are used to transfer the dynamic to the upper portion 301 when the transference dynamic is less than a magnetic dynamic. In contrast, if the transference dynamic is larger than the magnetic dynamic, such as when the image pick-up device 311 has gone back to its origin position, the magnetic driving device 321 will be departed to protect the mechanical components of the flatbed scanner 30.

It is necessary to include the twist-limited device 103 because the light projection device 107 and the image pick-up device 105 may not stop simultaneously (such as arrive to the origin or destination positions). For example, when one of the aforementioned devices arrives to the destination position than the other, the first arrived device will be suffered because the continuously supporting dynamic still drives the first arrived devices to keep moving if the twist-limited device 103 is absent. However, the twist-limited device 103 can depart the first arrived device to be driven by the dynamic until the other device arrives.

In conclusion, the present invention discloses a single dynamic source to generate dynamic for both the light projection device and the image pick-up device. When the dynamic is generated, it is then transferred by gear sets, transferred components, and pulleys to respectively drive the light projection device and the image pick-up device.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A scanning apparatus for scanning a document by using a single dynamic source force, said scanning apparatus comprising:

a first portion and a second portion that are coupled by a connection apparatus;

dynamic generating means positioned in said second portion for generating said single dynamic source force;

a plurality of gear sets for transferring said single dynamic source force from said second portion to said first portion;

light projection means located inside said first portion for illuminating said document when said document is a transparent document;

image pick-up means located inside said second portion for generating a scanned image of said document, said image pick-up means for illuminating said document when said document is a reflective document;

first transference means responsive to said single dynamic source force for driving said light projection means to move; and second transference means responsive to said single dynamic source force for driving said image pick-up means to move, said image pick-up means and said light projection means moving together to generate said scanned image.

2. The scanning apparatus according to claim 1, wherein said light projection means comprises at least a lamp.

3. The scanning apparatus according to claim 1, wherein said image pick-up means comprises an image sensor.

4. The scanning apparatus according to claim 1, further comprising twist-limited means for protecting said light projection means and said image pick-up means by departing a first arrived one between said light projection means and said image pick-up means, when one of said light projection means and said image pick-up means arrives an origin or a destination position.

5. The scanning apparatus according to claim 1, wherein said dynamic generating means comprises a motor for generating said single dynamic source force.

6. The scanning apparatus according to claim 5, wherein said dynamic generating means comprises a rotation speed reducing means for reducing a rotation speed of said motor before said single dynamic source force being exported.

7. The scanning apparatus according to claim 1, wherein said image pick-up means comprises:

light illuminating means for illuminating document when said document is a reflective document;

a plurality of mirrors for redirecting light from said document;

image generation means responsive to light redirected by said mirrors for generating said scanned image.

8. The scanning apparatus according to claim 7, wherein said light illuminating means comprises at least a lamp.

9. The scanning apparatus according to claim 7, wherein said image generation means comprises at least a lens.

10. A scanning apparatus for scanning a document by using a single dynamic source force, said scanning apparatus comprising:

a first portion and a second portion that are coupled by a connection apparatus;

a motor located in said second portion for generating said single dynamic source force;

rotation speed reducing means located in said second portion for providing a rotation speed less than that of said motor before said single dynamic source force being exported;

a plurality of gear sets for transferring said single dynamic source force from said second portion to said first portion;

light projection means located inside said first portion for illuminating said document when said document is a transparent document;

image pick-up means located inside said second portion for generating a scanned image of said document, said image pick-up means illuminating said document when said document is a reflective document;

twist-limited means for protecting said light projection means and said image pick-up means by decoupling a first arrived one between said light projection means and said image pick-up means, when one of said light projection means and said image pick-up arrives at an origin or a destination position;

first transference means responsive to said single dynamic source force for driving said light projection means to move; and second transference means responsive to said single dynamic source force for driving said image pick-up means to move, said image pick-up means and said light projection means moving together to perform an operation of generating said scanned image.

11. The scanning apparatus according to claim 10, wherein said light projection means comprises at least a lamp.

12. The scanning apparatus according to claim 10, wherein said image pick-up means comprises an image sensor.

13. The scanning apparatus according to claim 10, wherein said image pick-up means comprises:
  light illuminating means for illuminating said lights when said document is a reflective document;
  a plurality of mirrors for redirecting light from said document;
  image generation means responsive to light from said mirrors for generating said scanned image.

14. The scanning apparatus according to claim 13, wherein said light illuminating means comprises at least a lamp.

15. The scanning apparatus according to claim 13, wherein said image generation means comprises at least a lens.

* * * * *